(12) United States Patent
Lohse et al.

(10) Patent No.: US 8,173,748 B1
(45) Date of Patent: May 8, 2012

(54) HEAT-SEAL RESIN AND PACKAGE FORMED THEREFROM

(75) Inventors: David John Lohse, Bridgewater, NJ (US); Thomas Tungshi Sun, Clinton, NJ (US); Aspy K. Mehta, Humble, TX (US); Gabor Kiss, Hampton, NJ (US); Robert Patrick Reynolds, Jr., Clinton, NJ (US); John W. Chu, Neshanic Station, NJ (US); Manika Varma-Nair, Warren, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 12/972,035

(22) Filed: Dec. 17, 2010

(51) Int. Cl.
C08F 8/00 (2006.01)
C08L 23/00 (2006.01)
C08L 23/04 (2006.01)
C08L 23/10 (2006.01)

(52) U.S. Cl. ........................................ 525/191; 525/240

(58) Field of Classification Search .................. 525/191, 525/240
See application file for complete search history.

(56) References Cited

U.S. PATENT DOCUMENTS

| | | | |
|---|---|---|---|
| 5,256,228 A | 10/1993 | Davis et al. | |
| 5,382,630 A | 1/1995 | Stehling et al. | |
| 5,382,631 A | 1/1995 | Stehling et al. | |
| 5,530,065 A | 6/1996 | Farley et al. | |
| 6,106,938 A | 8/2000 | Setoh et al. | |
| 6,969,741 B2 | 11/2005 | Lustiger et al. | |
| 7,022,770 B2 | 4/2006 | Lustiger et al. | |
| 7,307,126 B2 | 12/2007 | Lustiger et al. | |
| 7,396,878 B2 | 7/2008 | Lustiger et al. | |
| 7,396,881 B2 | 7/2008 | Lustiger et al. | |
| 2004/0062942 A1 | 4/2004 | Lustiger et al. | |
| 2005/0215719 A1 | 9/2005 | Lustiger et al. | |
| 2005/0256266 A1 | 11/2005 | Lustiger et al. | |
| 2007/0142801 A1 | 6/2007 | Zhou et al. | |
| 2007/0161747 A1 | 7/2007 | Maier et al. | |

FOREIGN PATENT DOCUMENTS

| | | |
|---|---|---|
| EP | 0218332 | 10/1991 |
| EP | 0844280 | 3/2002 |
| EP | 1911803 | 4/2008 |
| JP | 2135244 | 5/1990 |
| JP | 2687503 | 12/1997 |
| JP | 10087908 | 4/1998 |
| JP | 3489347 | 1/2004 |
| JP | 2006150892 | 6/2006 |
| WO | 9003414 | 4/1990 |
| WO | 9513321 | 5/1995 |
| WO | 9748554 | 12/1997 |
| WO | 2004101673 | 11/2004 |
| WO | 2007070091 | 6/2007 |

OTHER PUBLICATIONS

376044, RD, Aug. 10, 1995, Anon.

*Primary Examiner* — Nathan M Nutter
(74) *Attorney, Agent, or Firm* — Robert A. Migliorini

(57) ABSTRACT

Provided is a heat-seal resin. The resin includes 5 wt % to 95 wt % of a first copolymer and 95 wt % to 5 wt % of a second copolymer based on the total weight of the resin. The first copolymer and the second copolymer together are 90 wt % or more of the total weight of the resin. The first copolymer includes a first monomer of an alphaolefin of 2 to 4 carbon atoms and a second monomer selected from a second monomer of an alphaolefin of 2 to 8 carbon atoms. The first monomer and the second monomer of the first copolymer are different. The first copolymer has an MFR of from 5 to 1000 g/10 minutes and a $T_{fm}$ of 66° C. to 80° C. The second copolymer includes a first monomer of an alphaolefin of 2 to 4 carbon atoms and a second monomer selected from a second monomer of an alphaolefin of 2 to 8 carbon atoms. The first monomer and the second monomer of the second copolymer are different. The second copolymer has an MFR of from 0.5 to 5 g/10 minutes and a $T_{fm}$ of 45° C. to 66° C., wherein the first copolymer has an MFR of at least 2 g/10 minutes greater and a $T_{fm}$ of at least 10° C. greater than the second copolymer. There is also a package formed partly or entirely of the resin.

6 Claims, 2 Drawing Sheets

HEAT-SEAL RESIN AND PACKAGE FORMED THEREFROM

FIELD

The disclosure relates to a heat-seal resin. The disclosure further relates to a heat-seal resin of a blend of two alphaolefin copolymers. The disclosure further relates to a package formed partly or entirely from the heat-seal resin.

BACKGROUND

Heat-sealable plastic resins, such as propylene-ethylene copolymers, are often used to manufacture packages that can be rapidly sealed upon rapid application of heat. In sealing, typically two sides of a closure are heated such that they interdiffuse to form a seal. The seal remains integral from the time of closure until the time of use, thus preserving product quality. Rapid sealing reduces the cost for producing the package, such as, for example, a bag for food.

In addition to exhibiting desirable levels of sealing strength and sealing speed and temperature, it is also desirable that the heat-seal resins exhibit a low level of extractables, i.e., a low level of substances in the polymer matrix that solubilize and permeate into the contents of the package upon contact therewith. A low level of extractables is particularly important when food products are being contained but is difficult to attain, as some substances in food products may act as a solvent for the extractables.

Selecting a heat-seal resin or blend of resins involves balancing of polymer physical properties. A high strength of seal typically correlates with high crystallinity and high molecular weight for the polymer. A low level of extractables in the resin correlates to high crystallinity (inverse relationship). In contrast, a low temperature of sealing, which facilitates rapid seal initiation at low temperatures and low energy, correlates to low crystallinity and low molecular weight. The temperature at which sealing is initiated is referred to as the "seal initiation temperature" or SIT. Balancing of properties typically requires the use of blends of two or more resins of different physical properties.

One method employed in the art to provide a proper balance of polymer physical properties in heat-seal resins is to use Ziegler-Natta copolymers and terpolymers of broad orthogonal composition distribution (BOCD). BOCD copolymers and terpolymers are disclosed, for example, in U.S. Pat. Nos. 5,382,630; 5,382,631; 5,530,065; 6,969,741; 7,022,770; 7,307,126; 7,396,878; and 7,396,881. A disadvantage of heat-seal resins made using Ziegler-Natta catalysts is deficiency in performance in one or more physical properties. Heat-seal resins made using Ziegler-Natta catalysts are known to produce broad, uncontrolled distributions with respect to both molecular weight and comonomer content. A disadvantage of terpolymers using Ziegler-Natta catalysts is high production cost.

It would be desirable to have a resin blend that exhibited high seal strength, a low level of extractables in the resin, a low seal initiation temperature (SIT). It would also be desirable to have an alphaolefin copolymer blend that exhibited such properties.

SUMMARY

According to the present disclosure, there is provided a heat-seal resin. The resin is a polymer blend of 5 wt % to 95 wt % of a first copolymer and 95 wt % to 5 wt % of a second copolymer based on the total weight of the resin. The first copolymer and the second copolymer together are 90 wt % or more of the total weight of the resin. The first copolymer includes a first monomer of an alphaolefin of 2 to 4 carbon atoms and a second monomer selected from a second monomer of an alphaolefin of 2 to 8 carbon atoms. The first monomer and the second monomer of the first copolymer are different. The first copolymer has an MFR of from 5 to 1000 g/10 minutes and a $T_{fm}$ of 66° C. to 80° C. The second copolymer includes a first monomer of an alphaolefin of 2 to 4 carbon atoms and a second monomer selected from a second monomer of an alphaolefin of 2 to 8 carbon atoms. The first monomer and the second monomer of the second copolymer are different. The second copolymer has an MFR of from 0.5 to 5 g/10 minutes and a $T_{fm}$ of 45° C. to 66° C., wherein the first copolymer has an MFR of at least 2 g/10 minutes greater and a $T_{fm}$ of at least 10° C. greater than the second copolymer.

Further according to the present disclosure, there is provided a package formed partly or entirely of the heat-seal resin described above.

DETAILED DESCRIPTION

Figure 1:
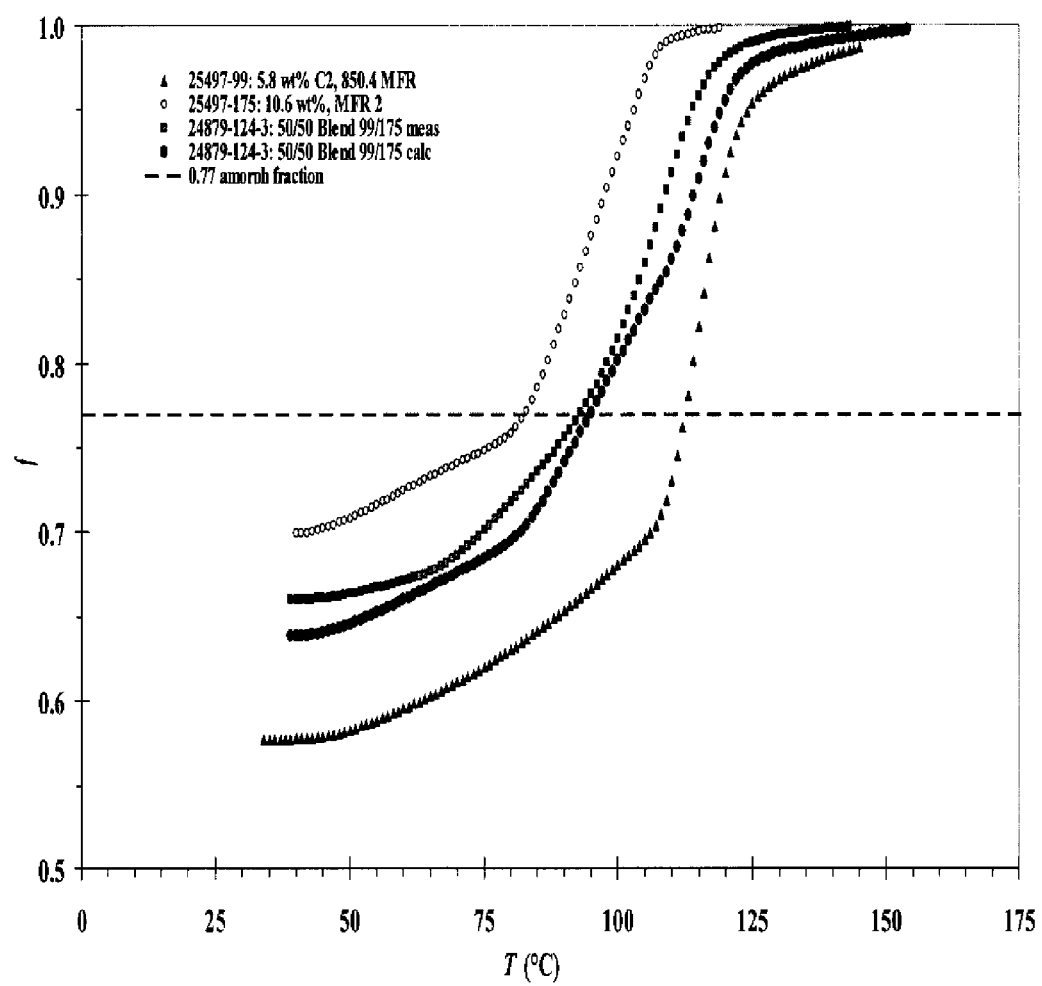
FIG. 1 is a plot of percent amorphous content vs. temperature: second heat for ethylene-propylene copolymers of the examples of the present disclosure.
Figure 2:
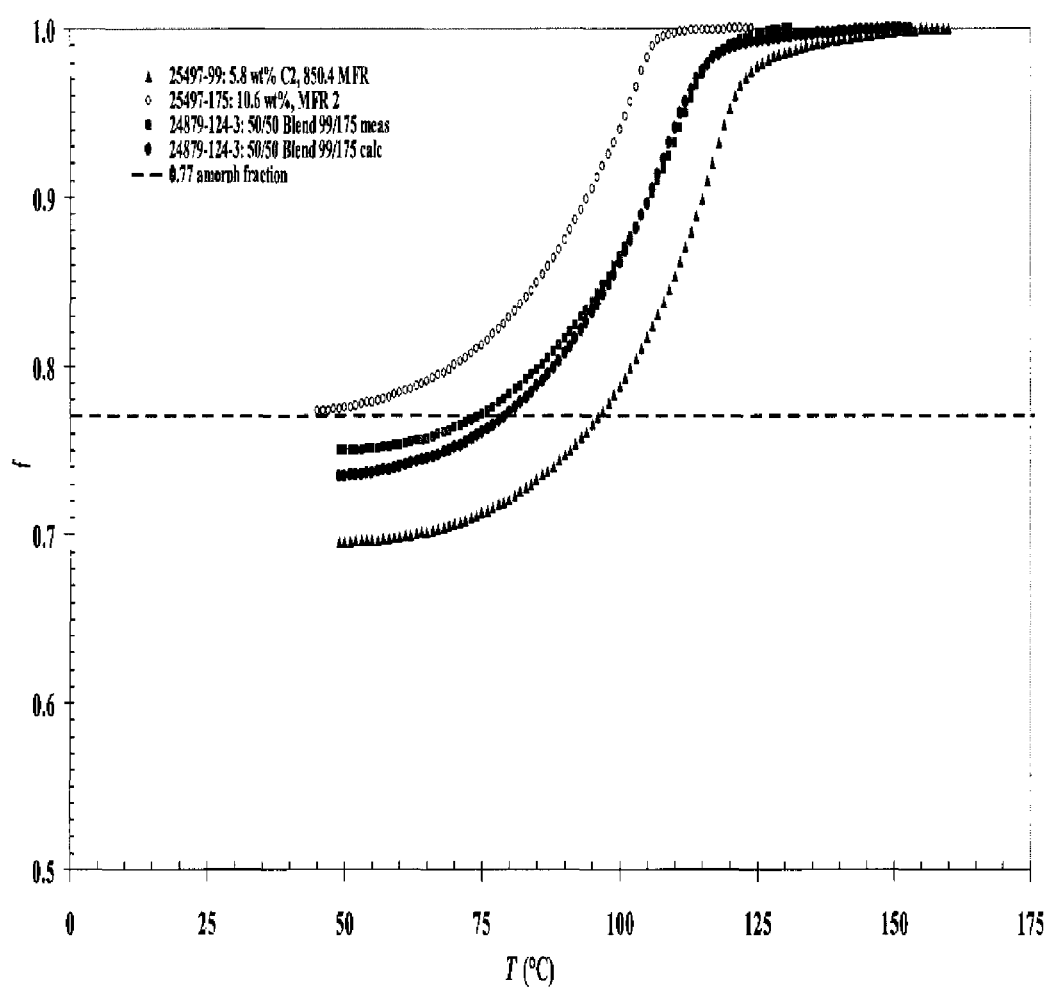
FIG. 2 is a plot of percent amorphous content vs. temperature: first heat for ethylene-propylene copolymers of the examples of the present disclosure.

All numerical values within the detailed description and the claims herein are modified by "about" or "approximately" the indicated value, and take into account experimental error and variations that would be expected by a person having ordinary skill in the art.

The heat-seal resin of the present disclosure employs a blend of alphaolefin copolymers, one of higher crystallinity (low ethylene content) and lower molecular weight, and the other of lower crystallinity (high ethylene content) and higher molecular weight. In the instance of ethylene/propylene copolymers, the copolymer of higher crystallinity and lower molecular weight will have lower ethylene content, and the copolymer of lower crystallinity and higher molecular weight will have higher ethylene content. The combination of lower crystallinity and higher molecular weight in one copolymer minimizes any tendency of extraction while improving SIT. The combination of higher crystallinity and lower molecular weight in the other copolymer counterbalances the properties of the other copolymer and helps to increase overall performance by improving seal strength.

The resin blend has two or more copolymers. Two copolymers are preferred. The resin has 5 wt % to 95 wt % of a first copolymer and 95 wt % to 5 wt % of a second copolymer based on the total weight of the resin. The resin has 10 wt % to 90 wt % of a first copolymer and 90 wt % to 10 wt % of a second copolymer based on the total weight of the resin. The first copolymer and the second copolymer together are 90 wt % or more and in some embodiments 95% or more of the total weight of the resin.

The first copolymer includes a first monomer of an alphaolefin of 2 to 4 carbon atoms and a second monomer selected from a second monomer of an alphaolefin of 2 to 8 carbon atoms. The first monomer of the first copolymer and the second monomer of the first copolymer are different. The first copolymer has an MFR of from 5 to 1000 g/10 minutes and preferably 10 to 100 g/10 minutes. The first copolymer has a $T_{fm}$, of 66° C. to 80° C. and preferably 70° C. to 80° C. MFR corresponds to melt flow rate and is measured according to ASTM 1238. Melt flow rate is used herein as a method for measuring viscosity as it relates to molecular weight, which is generally inverse thereof. $T_{fm}$ corresponds to the temperature at which melting is first observed after heating in differential scanning calorimetry (DSC). $T_{fm}$ relates to the beginning of the melting process, and, thus, the seal initiation temperature (SIT). The beginning of the melting process relates to the size of the crystalline lamellae in the material, which for these polymers is principally controlled by the length of crystallizable sequences in the polymer chains.

The second copolymer includes a first monomer of an alphaolefin of 2 to 4 carbon atoms and a second monomer selected from a second monomer of an alphaolefin of 2 to 8 carbon atoms. The first monomer of the second copolymer and the second monomer of the second copolymer are different. The second copolymer has an MFR of from 0.5 to 5 g/10 minutes and preferably 1 to 4 g/10 minutes. The second copolymer has a $T_{fm}$ of 45° C. to 66° C. and preferably 50° C. to 60° C.

The first copolymer and the second copolymer vary from each other with respect to molecular weight and crystallinity such that the resin blend derives the physical performance benefit of having two copolymers with different physical properties. The variation in molecular weight and crystallinity between the first copolymer and the second copolymer is characterized by a difference in relative MFR and relative $T_{fm}$. The difference in MFR between the first copolymer and that of the second copolymer is at least 2 g/10 minutes and preferably at least 5 g/10 minutes. The difference in $T_{fm}$ between the first copolymer and that of the second copolymer is at least 10° C. and preferably at least 20° C.

Synthesis of the copolymers of the resin blend is possible with the use of single-site metallocene catalysts. Such catalysts make it possible to tailor the distribution of both molecular weight and composition to optimize the properties of resin blends for many applications by making deliberate blends of narrowly distributed polymers. Thus, the high molecular weight chains should be the lowest in crystallinity, or vice versa. The short, highly crystalline chains can diffuse rapidly so as to crystallize quickly, and then the long, poorly crystalline chains crystallize with them and provide long amorphous sections to link all of the crystalline domains together ("tie chains"). Such a combination provides optimal performance in heat-seal resins.

Useful metallocene catalysts can be made from a variety of catalyst precursors, which include, for example, 2,4-substituted bridged bisindenyl zirconium and hafnium metallocenes, such as the dimethyl μ-dimethylsilyl-(2-methyl-4-phenylindenyl)zirconium (Q-Zr-Me$_2$), dimethyl μ-dimethylsilyl-(2-methyl-4-naphthylindenyl)zirconium (T-Zr-Me$_2$), or dimethyl μ-dimethylsilyl-(2-methyl-4-naphthylindenyl)hafnium (T-Hf-Me$_2$), or dimethyl μ-dimethylsilyl-(2-methyl-4-(3'5'-tert-butyl)indenyl)zirconium ((3'5'-tBu-Q)-Zr-Me$_2$), and the like. Such catalyst precursors can be activated prior to feeding to the polymerization reactor or in the reactor by various non-coordinating anion-type activators, among them fluoroalkyl borates, eg., dimethylanilinium-tetrakis(pentafluorophenyl)borate (D4), and dimethylanilinium-tetrakis(heptafluoronaphthyl)borate (D9), and aluminoxane-type activators, eg., methyluminixane (MAO). In the current disclosure, the D4-activated T-Zr-Me$_2$ catalyst is designated as T-Zr-D4, while the D9-activated (3'5'-tBu-Q)-Zr-Me$_2$ catalyst is designated as (3'5'-tBu-Q)-Zr-D9.

Useful copolymers include propylene-based copolymers in which the comonomer is ethylene. However, these methods should also apply to copolymers of propylene (with >85 mol % propylene) with other comonomers, such as, for example, α-olefin comonomers (1-butene, 1-hexene, and 1-octene), as well as to copolymers where the main monomer is ethylene, or 1-butene (with >85 mol % ethylene or butene-1, respectively), and the comonomer is propylene or $C_4$-$C_8$ alphaolefins for the ethylene copolymers and propylene and $C_5$-$C_8$ alphaolefins for the butene-1 copolymers.

Preferred catalysts used for making propylene-rich heat-seal copolymers maximize the melting peak temperature at a given ethylene (or other comonomer) concentration. Without being bound to any particular theory, such catalysts typically incorporate propylene in a highly stereo- and regioregular fashion. One way of characterizing the ability of the metallocene catalyst to deliver heat-seal resins of desired melting temperature is to homopolymerize propylene with the catalyst in solution between 75° C. and 105° C. Suitable metallocene catalysts for making heat-seal resin components disclosed herein will yield polypropylenes with a melting peak temperature of >152° C. in a second DSC melting cycle.

The suitability of metallocene catalysts for producing the heat-seal propylene-rich copolymers can also be determined by analyzing the melting peak temperatures of propylene-rich copolymers with various comonomer contents. As FIG. 1 shows, the melting peak temperature of propylene-rich copolymers linearly drops with increasing comonomer concentration (see FIG. 1). Thus, a linear fit can also be used for determining the melting peak temperature of the homopolymer to tell whether a metallocene catalyst will produce heat-seal copolymer components suitable for making the disclosed heat-seal resins. Namely, the zero comonomer intercept of a linear fit to the melting peak temperature vs. comonomer concentration plot should be >152° C. with catalysts suitable for making the disclosed copolymer components.

The heat-seal resin of the present disclosure is useful in forming heat-sealable packages. A package may be formed partly or entirely of the resin, but will typically have a sealing layer formed from the resin in the package. The resin permits packages to be sealed rapidly and effectively during manufacture. Use of the resin is particularly effective in the vicinity of the closure. Examples of packages and packaging applications in which the resin is useful include bags to contain solid or liquid foods, packaging for cosmetics and pharmaceuticals, and other containers.

The following are examples of the present disclosure and are not to be construed as limiting.

EXAMPLES

Resin blends of ethylene-propylene copolymers were prepared by melt-blending the resin blend components.

Ethylene monomer (Airgas, grade 4.5) and propylene monomer (Airgas, grade 2.5) were used. Polymer syntheses were performed using a continuous-flow stirred tank reactor (CSTR) made by Autoclave Engineers, Erie Pa. The reactor was designed to operate at a maximum pressure and temperature of 2000 bar (30 kpsi) and 225 C, respectively. The unit could be configured with two different reactor bodies having nominal reactor volumes of either 150 or 360 mL with working volumes of 127 or 347 mL, respectively (working volumes lower due to reactor internals). The reactor was equipped with a magnetically coupled stirrer (MagneDrive™ by Autoclave Engineers). A pressure transducer located on the monomer feed line measured the pressure in the reactor. The reactor temperature was measured using a type-K thermocouple. The reactor was protected against over-pressurization by automatic opening of an air-actuated valve (High Pressure Company, Erie, Pa.) in case the reactor pressure exceeded the preset limit. A flush-mounted rupture disk located on the side of the reactor provided further protection against catastrophic pressure failure. All product lines were heated to ~150° C. to prevent fouling. The reactor was heated by two electric heating bands that were controlled by a programmable logic control device (PLC). Except for the heat losses to the environment, the reactor did not have cooling (semi-adiabatic operations).

The conversion in the reactor was monitored by the temperature difference between the reaction mixture and the outside reactor skin and by an on-line gas chromatograph (GC) that sampled both the feed and the effluent. The GC analysis utilized the propane impurity present in the propylene feed as an internal standard. The reactor temperature and the temperature difference across the reactor wall were maintained by adjusting the reactor heater output (skin temperature) and the catalyst feed rate.

The feed purification traps were deemed adequate for controlling impurities carried by the monomer feed. Two purification traps in series were placed in the containment cell right before the feed pump. They were filled with activated copper (reduced in flowing $H_2$ at 225 C and 1 bar) for $O_2$ removal followed by a molecular sieve (1:1 mix of 5A and 13X, activated in flowing $N_2$ at 270° C.) for water removal.

HPLC-grade toluene (99.9%, J. T. Baker) was used for preparing the catalyst stock solution. The solvent was first purged with nitrogen and then stirred over NaK alloy (56 wt % K, Sigma-Aldrich) for at least 24 hours. The NaK-treated toluene was filtered twice over activated basic alumina (standard grade, 150 mesh, 155 $m^2$/g, 58 Å, Sigma-Aldrich, #19, 944-3). The activated basic alumina was prepared by vacuum drying at 120° C. for 16 hours and was immediately brought into the dry box while still hot.

HPLC grade hexane (95% n-hexane, J. T. Baker) was used as a solvent. It was purged with Argon for a minimum of four hours and was filtered once over activated basic alumina. The filtered hexane was stored in a 4-liter glass vessel (Ace Glass, Vineland, N.J.) inside an argon-filled dry box. The solvent was further purified by adding 1.5 mL (1.05 g) of tri-n-octylaluminum (Aldrich #38, 655-3) scavenger to the 4-liter reservoir of filtered hexane. 5-10 psig head pressure of argon was applied to the glass vessel to deliver the solvent to a 4-liter metal feed vessel inside the containment cell. After refilling, the metal feed vessel was isolated from the glass storage vessel in the dry box and was placed under 3.4 bar (50 psig) head pressure of $N_2$. The feed vessel was also equipped with a differential pressure gauge to monitor the solvent inventory.

The solvent was fed by a diaphragm pump (Model MhR 150/6, ProMinent Orlita, Germany) with a 1-50 mL/minute capacity via a side port into the reactor. The solvent feed rate varied between 5 and 15 g/minute resulting in ~1-20 mol ppm trioctylaluminum in the combined feed. The solvent was combined with the catalyst feed just upstream of the reactor.

The activated catalyst solution was delivered using a dual-barrel, high-pressure syringe pump (PDC Machines, Warminster, Pa.). The activated catalyst solution was mixed with the scavenger-treated hexane at the feed port of the reactor.

The monomer was fed from a low-pressure blending vessel equipped with a dip leg for liquid delivery to the reactor. A heating blanket (Ace) was used to increase the cylinder head pressure to 17 bar (~250 psig). This increased head pressure allowed the monomer to be delivered to the monomer feed pump head at a pressure above its bubble point at the pump. The low-pressure monomer feed was also stabilized against bubble formation by cooling the pump head using 10° C. chilled water. The monomer feed was purified using two separate beds in series: activated copper (reduced in flowing $H_2$ at 225° C. and 1 bar) for $O_2$ removal and molecular sieve (1:1 mic of 5A and 13X, activated in flowing $N_2$ at 270° C.) for water removal. The purified monomer feed was fed by a diaphragm pump (Model MhS 600/11, ProMinent Orlita, Germany) through the stirrer head into the reactor. The monomer flow rate was adjusted by adjusting the motor speed of the pump and was measured by a Coriolis mass flow meter (Model PROline Promass 80, Endress and Hauser) located downstream of the purification traps and before the feed pump. The reported feed flows were determined by averaging the flow rate recorded during the entire balance period.

Two independent lock-hopper assemblies were used to manage the effluent flow from the reactor: one for waste collection during start up and shut down and the other one for product collection during the balance period at lined out, steady state conditions. Each lock-hopper consisted of two air-actuated valves bracketing a short piece of high-pressure tubing. Changing the internal diameter and/or the length of the lock-hopper tube allowed the adjustment of the volume of the lock-hoppers. Aliquots of the reactor content were taken out continuously by running the lock-hopper valves in cycles. One lock-hopper cycle consisted of first opening and closing of the valve between the lock-hopper tube and the reactor followed by opening and closing the downstream valve. Adjustments in the frequency of the lock-hopper cycles allowed maintaining the desired reactor pressure at a preset feed rate. The volume and the frequency of the two lock-hoppers were always set the same to allow switching between the lock-hoppers without affecting the steady state condition of the reactor. A drain port on the bottom of the reactor was used to empty the reactor after each experiment.

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 110° C. and transferred hot to the antechamber of the dry box. Stock solutions of the catalyst precursors and the activators were prepared using toluene and stored in amber bottles inside the dry box. Aliquots were taken to prepare fresh activated catalyst solutions. The activated catalyst solution was charged inside the argon-filled dry box to a heavy-walled glass reservoir (Ace Glass, Inc. Vineland, N.J.) and was pressurized to 5 psig with argon. The glass feed vessel was wrapped with aluminum foil to prevent decomposition caused by light exposure. The activated catalyst feed solutions were typically stable and usable for several days.

Toluene solvent was used to purge the feed lines and the reactor before and after each experiment. The solvent feed was tied in via three-way valves to both the scavenger and the liquid monomer feed lines. The toluene solvent used for flushing was purified using two separate beds in series: activated copper (reduced in flowing $H_2$ at 225° C. and 1 bar) for $O_2$ removal and molecular sieve (1:1 mix of 5A and 13X, activated in flowing $N_2$ at 270° C.) for water removal. The purified toluene solvent was stored under nitrogen in a 4-liter metal feed vessel that was kept under 3.4 bar (50 psi) head pressure of $N_2$. The feed vessel was also equipped with a differential pressure gauge to monitor the toluene inventory.

In a typical experiment, the reactor was preheated to ~10-15° C. below that of the desired reaction temperature. Once the reactor reached the preheat temperature, the solvent pump was turned on to deliver tri-n-octylaluminum-spiked hexane to the reactor from the 4-liter solvent feed vessel. After the flow of solvent to the reactor was verified by monitoring the amount of solvent taken from the feed vessel, the monomer pump was turned on. The reactor was purged when the pressure increased to ~100 bar (~1.5 kpsi) by opening each valve briefly. This reduced the pressure in the reactor and verified that all ports in the reactor were operational. After all valves had been tested and the reactor reached the desired reaction pressure, the syringe pump containing the activated catalyst solution was pressurized. When the syringe pump pressure exceeded the reactor pressure by 27 bar (~400 psi) an air actuated solenoid valve was opened to allow the catalyst solution to mix with the stream of flowing solvent upstream of the reactor. This stream of solvent/catalyst solution entered the reactor through a port on the side of the reactor. The arrival of the catalyst to the reactor was indicated by an increase in the reaction temperature caused by the exothermic polymerization reaction. During the line-out period, the catalyst feed and lock-hopper rates were adjusted to reach and maintain the target reaction temperature, pressure, and conversion. Once the reactor reached steady state at the desired conditions, the reactor effluent was switched from the waste collection to the on-balance product collection vessel. The reactor was typically on-balance between 30 to 90 minutes, after which the effluent was redirected to the waste collection vessel and the reactor was shut down. The on-balance products were collected and treated with a stabilizer (Irganox 1010) to prevent degradation. The stabilized products were weighed after vacuum-drying overnight at 70° C. Aliquots of the product were used for characterization without homogenizing the entire product yield. The conversion and reaction rates were determined based on the total feed used and the product yield during the balance period.

In addition to formation by melt blending, resin blends can be also prepared by in-line blending of resin components utilizing multiple reactors making the resin blend components. The reactors in such plants can be configured parallel or in series. Useful in-line blending methods are disclosed in U.S. Published Patent Application US 2008-0234443 A1.

In the following tables we show examples of the resins that have been made by the process described above. In Tables 1 and 2 we show the process and product data for resins made using the catalyst precursor (dimethyl µ-dimethylsilyl-(2-methyl-4-naphthylindenyl)zirconium or T-Zr-Me$_2$), and in Tables 3 and 4 that of resins made with the precursor (dimethyl β-dimethylsilyl-(2-methyl-4-(3'5'-tert-butypindenyl) zirconium, or (3'5'-tBu-Q)-Zr-Me$_2$). The catalyst precursors were activated using dimethylanilinium-tetrakis(pentafluorophenyl)borate (D4) and dimethylanilinium-tetrakis(heptafluoronaphthyl)borate (D9).

TABLE 1

(Process Data for Resins made with T-Zr-Me$_2$ precursor)

| | | | Reactor conditions | | | | | | | |
|---|---|---|---|---|---|---|---|---|---|---|
| Synthesis # | Activator Type | Solvent Type | Temperature ° C. | Pressure psig | Total solvent wt % | $C_3^-$ feed (solvent included) wt % | $C_3^=$ conv. % | $C_2^-$ feed (solvent included) wt % | $C_2^=$ conv. % | Total monomer feed | Res. time min |
| 25497-128 | D4 | Hexane | 75 | 1748 | 74.9 | 23.0 | 34.9 | 1.0 | 33.7 | 24.0 | 11.6 |
| 25704-123 | D4 | Hexane | 75 | 1627 | 75.1 | 24.2 | 40.5 | 0.7 | 73.9 | 24.9 | 10.3 |
| 25704-128 | D4 | Hexane | 85 | 1635 | 74.7 | 24.5 | 36.7 | 0.7 | 71.6 | 25.2 | 9.6 |
| 25497-123 | D4 | Hexane | 77 | 1736 | 73.6 | 24.0 | 32.2 | 1.5 | 34.0 | 25.5 | 11.0 |
| 25497-172 | D4 | Hexane | 78 | 2001 | 66.7 | 30.7 | 17.8 | 0.9 | 20.5 | 31.6 | 18.4 |
| 25497-141 | D4 | Hexane | 75 | 1929 | 60.7 | 36.4 | 24.0 | 1.8 | 25.7 | 38.1 | 19.2 |
| 25497-111 | D4 | Hexane | 80 | 1752 | 70.9 | 22.8 | 39.2 | 1.5 | 30.5 | 24.3 | 11.4 |
| 25497-119 | D4 | Hexane | 75 | 1741 | 75.3 | 22.6 | 33.4 | 1.1 | 32.5 | 23.7 | 11.6 |
| 25497-166 | D4 | Hexane | 76 | 1515 | 65.9 | 31.9 | 10.5 | 1.7 | 11.4 | 33.6 | 11.3 |
| 25497-099 | D4 | Hexane | 105 | 1571 | 71.1 | 26.5 | 50.1 | 1.7 | 49.8 | 28.3 | 10.6 |
| 25497-115 | D4 | Hexane | 75 | 1884 | 70.6 | 20.9 | 36.2 | 1.1 | 36.7 | 22.1 | 12.6 |
| 25497-107 | D4 | Hexane | 90 | 1704 | 70.5 | 24.7 | 46.0 | 1.9 | 39.1 | 26.6 | 10.8 |
| 25704-089 | D4 | Hexane | 93 | 1666 | 75.3 | 23.3 | 46.9 | 1.4 | 52.4 | 24.7 | 11.3 |
| 25497-139 | D4 | Hexane | 82 | 2111 | 64.3 | 32.3 | 29.5 | 1.7 | 32.4 | 34.1 | 19.0 |
| 25497-103 | D4 | Hexane | 94 | 1818 | 70.4 | 25.8 | 42.0 | 1.4 | 47.1 | 27.2 | 10.4 |
| 25704-084 | D4 | Hexane | 95 | 1678 | 74.6 | 24.0 | 46.4 | 1.5 | 53.4 | 25.5 | 11.3 |
| 25704-138 | D4 | Hexane | 73 | 1610 | 74.1 | 24.5 | 61.6 | 1.4 | 79.1 | 25.9 | 10.3 |
| 25497-162 | D4 | Hexane | 78 | 1783 | 62.4 | 34.1 | 30.1 | 1.9 | 30.4 | 36.0 | 20.7 |
| 25497-158 | D4 | Hexane | 80 | 1676 | 55.8 | 39.6 | 37.7 | 2.6 | 42.0 | 42.3 | 20.5 |
| 25497-175 | D4 | Hexane | 79 | 1760 | 63.7 | 33.9 | 35.1 | 2.8 | 55.9 | 36.7 | 21.8 |
| 25497-154 | D4 | Hexane | 80 | 1969 | 62.3 | 32.7 | 33.7 | 2.5 | 35.7 | 35.2 | 19.5 |
| 25497-184 | D4 | Hexane | 76 | 1791 | 67.0 | 28.7 | 30.8 | 2.5 | 34.3 | 31.2 | 18.4 |
| 25704-017 | D4 | Hexane | 73 | 1576 | 74.4 | 22.9 | 43.6 | 2.8 | 37.7 | 25.7 | 14.5 |
| 25668-176 | D4 | Hexane | 75 | 1652 | 76.9 | 20.2 | 42.1 | 2.9 | 31.1 | 23.2 | 7.9 |
| 25668-166 | D4 | Hexane | 75 | 1692 | 74.8 | 22.4 | 39.3 | 2.7 | 37.7 | 25.1 | 8.3 |
| 25668-161 | D4 | Hexane | 95 | 1680 | 75.5 | 21.9 | 50.6 | 2.7 | 58.9 | 24.6 | 7.7 |
| 25704-045 | D4 | Hexane | 74 | 1710 | 74.5 | 22.0 | 44.0 | 3.4 | 40.6 | 25.5 | 13.0 |
| 25704-013 | D4 | Hexane | 86 | 1667 | 73.9 | 23.0 | 50.4 | 3.1 | 53.4 | 26.1 | 13.1 |
| 25622-096 | D9 | Hexane | 68 | 1623 | 70.0 | 26.8 | 42.7 | 3.2 | 47.9 | 30.0 | 15.1 |
| 25622-077 | D9 | Hexane | 73 | 1341 | 68.5 | 28.1 | 32.6 | 3.5 | 38.6 | 31.7 | 13.4 |
| 25622-092 | D9 | Hexane | 65 | 1565 | 70.5 | 25.9 | 36.4 | 3.3 | 40.5 | 29.2 | 15.5 |

TABLE 2

(Product Data for Resins made with T-Zr-Me₂ Precursor)

| Synthesis # | MFR g/10 min | Cryst. Onset °C | Cryst. Peak °C | Melting (first) Peak °C | Melting (first) ΔHf J/g | Melting (second) Onset °C | Melting (second) Peak °C | Melting (second) ΔHf J/g | GPC DRI Mw kg/mol | GPC DRI Mw/Mn | IR C₂⁼ mol % | IR C₂⁼ wt % |
|---|---|---|---|---|---|---|---|---|---|---|---|---|
| 25497-128 | 3.8 | 85.8 | 81.4 | 121.7 | 70.5 | 60.6 | 119.5 | 56.3 | 218.3 | 2.25 | 7.1 | 4.9 |
| 25704-123 | 365.0 | 94.2 | 91.5 | 128.3 | 94.2 | 49.7 | 126.0 | 74.9 | 103.9 | 3.11 | 7.6 | 5.2 |
| 25704-128 | 380.0 | 93.6 | 90.3 | 127.5 | 93.5 | 45.0 | 125.4 | 77.9 | 106.8 | 2.73 | 7.7 | 5.3 |
| 25497-123 | 3.0 | 82.5 | 79.0 | 118.9 | 75.2 | 25.3 | 116.9 | 61.8 | 219.1 | 2.34 | 7.8 | 5.3 |
| 25497-172 | 1.4 | 85.3 | 81.5 | 112.8 | 77.7 | 37.8 | 117.3 | 65.8 | 353.1 | 2.15 | 8.0 | 5.5 |
| 25497-141 | 1.4 | 81.7 | 78.5 | 115.8 | 85.1 | 48.4 | 114.2 | 57.1 | 338.8 | 2.11 | 8.1 | 5.5 |
| 25497-111 | 9.4 | 81.2 | 78.7 | 115.0 | 88.9 | 51.8 | 115.1 | 61.2 | 203.6 | 2.16 | 8.2 | 5.6 |
| 25497-119 | 5.0 | 80.3 | 78.2 | 116.2 | 78.0 | 48.6 | 115.3 | 56.6 | 222.8 | 2.41 | 8.3 | 5.7 |
| 25497-166 | 2.4 | 82.9 | 80.5 | 113.3 | 68.7 | 67.3 | 115.0 | 47.8 | 402.9 | 2.09 | 8.5 | 5.8 |
| 25497-099 | 850.4 | 88.0 | 83.4 | 115.3 | 87.7 | 50.0 | 117.6 | 62.2 | 76.7 | 2.23 | 8.6 | 5.9 |
| 25497-115 | 7.5 | 78.2 | 76.8 | 112.1 | 75.1 | 44.8 | 111.6 | 59.0 | 222.9 | 2.42 | 9.1 | 6.2 |
| 25497-107 | 29.8 | 77.9 | 76.4 | 109.7 | 78.8 | 45.7 | 110.7 | 59.3 | 136.3 | 2.11 | 9.1 | 6.2 |
| 25704-089 | 45.3 | 74.6 | 72.7 | 111.3 | 73.4 | 36.2 | 111.0 | 58.3 | 128.0 | 2.03 | 9.2 | 6.3 |
| 25497-139 | 5.3 | 77.9 | 75.3 | 109.6 | 73.5 | 59.0 | 110.2 | 49.6 | 263.5 | 2.17 | 9.2 | 6.3 |
| 25497-103 | 41.5 | 78.0 | 76.2 | 114.7 | 74.2 | 43.6 | 112.5 | 56.8 | 121.9 | 2.04 | 9.3 | 6.4 |
| 25704-084 | 78.6 | 74.1 | 72.0 | 107.1 | 79.7 | 40.6 | 108.1 | 57.6 | 128.0 | 2.00 | 9.8 | 6.8 |
| 25704-138 | 21.5 | 79.8 | 75.5 | 100.6 | 69.3 | 35.4 | 110.2 | 53.4 | 32.2 | 3.48 | 9.9 | 6.8 |
| 25497-162 | 3.1 | 76.2 | 73.9 | 113.7 | 66.2 | 51.7 | 110.1 | 49.2 | 283.6 | 2.12 | 9.9 | 6.8 |
| 25497-158 | 5.0 | 72.6 | 70.7 | 111.8 | 54.7 | 49.0 | 105.2 | 40.5 | 239.3 | 2.26 | 10.9 | 7.5 |
| 25497-175 | 2.0 | 72.1 | 68.6 | 95.4 | 63.2 | 38.6 | 103.4 | 47.6 | 306.9 | 2.27 | 11.0 | 7.6 |
| 25497-154 | 3.6 | 68.6 | 65.4 | 102.5 | 63.7 | 46.0 | 101.7 | 45.1 | 245.3 | 2.14 | 11.1 | 7.7 |
| 25497-184 | 1.4 | 60.4 | 56.4 | 91.5 | 53.1 | 26.6 | 93.6 | 42.4 | 314.5 | 2.36 | 13.4 | 9.3 |
| 25704-017 | 4.1 | 42.8 | 37.3 | 69.4 | 45.0 | 18.7 | 79.1 | 33.9 | 248.8 | 2.38 | 13.7 | 9.6 |
| 25668-176 | 6.2 | 35.2 | 28.5 | 51.8 | 32.3 | 7.5 | 71.7 | 30.2 | 228.0 | 2.23 | 13.9 | 9.7 |
| 25668-166 | 6.5 | 51.9 | 47.7 | 86.2 | 46.9 | 25.9 | 85.4 | 34.3 | 223.4 | 2.52 | 14.4 | 10.1 |
| 25668-161 | 54.5 | 43.1 | 37.7 | 73.0 | 40.5 | 10.6 | 78.5 | 34.3 | 118.6 | 2.04 | 17.7 | 12.5 |
| 25704-045 | 4.3 | 26.6 | 12.4 | 46.8 | 25.9 | 1.6 | 61.1 | 30.0 | 233.4 | 2.41 | 17.7 | 12.6 |
| 25704-013 | 24.3 | 34.4 | 28.5 | 37.9 | 35.6 | 14.7 | 72.9 | 28.4 | 146.5 | 2.34 | 17.8 | 12.6 |
| 25622-096 | 14.9 | 37.0 | 30.6 | 66.5 | 35.8 | 17.8 | 72.9 | 27.9 | 186.6 | 2.22 | 17.7 | 12.5 |
| 25622-077 | 4.5 | 38.7 | 29.4 | 71.2 | 34.4 | −0.8 | 71.9 | 32.2 | 205.7 | 2.54 | 17.8 | 12.6 |
| 25622-092 | 3.9 | 32.9 | 24.9 | 49.9 | 35.0 | 14.4 | 68.6 | 27.1 | 236.8 | 2.35 | 18.0 | 12.8 |

TABLE 3

(Process Data for Resins made with (3'5'-tBu-Q)-Zr-Me₂ Precursor)

Reactor conditions

| Synthesis # | Activator Type | Solvent Type | Temp. °C | Pressure psig | Total solvent wt % | C₃⁼ feed (solvent included) wt % | C₃⁼ conv. % | C₂⁼ feed (solvent included) wt % | C₂⁼ conv. % | Total monomer feed wt % | Res. time min |
|---|---|---|---|---|---|---|---|---|---|---|---|
| 25602-125 | D9 | Hexane | 83 | 1981 | 45.9 | 52.8 | 31.3 | 1.0 | 47.7 | 53.8 | 22.5 |
| 25602-178 | D9 | Hexane | 74 | 1433 | 68.4 | 30.5 | 27.7 | 0.7 | 40.8 | 31.2 | 15.3 |
| 25602-172 | D9 | Hexane | 71 | 1522 | 68.3 | 30.8 | 27.4 | 0.7 | 39.6 | 31.5 | 15.2 |
| 25602-137 | D9 | Hexane | 78 | 1651 | 50.3 | 47.8 | 38.7 | 1.3 | 62.1 | 49.1 | 31.2 |
| 25622-021 | D9 | Hexane | 72 | 1440 | 67.0 | 31.3 | 36.2 | 1.7 | 48.4 | 32.9 | 12.8 |
| 25622-026 | D9 | Hexane | 72 | 1292 | 64.6 | 33.7 | 36.1 | 1.7 | 48.9 | 35.4 | 13.0 |
| 25622-006 | D9 | Hexane | 75 | 1547 | 66.6 | 30.9 | 44.6 | 2.0 | 58.9 | 32.9 | 16.2 |
| 25622-034 | D9 | Hexane | 74 | 1738 | 67.6 | 30.6 | 41.3 | 1.6 | 57.5 | 32.1 | 12.2 |
| 25602-153 | D9 | Hexane | 76 | 1917 | 67.9 | 30.1 | 43.5 | 1.8 | 54.9 | 31.8 | 21.1 |
| 25602-141 | D9 | Hexane | 80 | 1945 | 44.1 | 52.9 | 29.2 | 3.1 | 48.6 | 56.0 | 22.8 |
| 25622-030 | D9 | Hexane | 75 | 1672 | 67.1 | 31.0 | 41.8 | 1.6 | 60.5 | 32.7 | 12.6 |
| 25602-167 | D9 | Hexane | 73 | 1870 | 68.2 | 29.8 | 32.2 | 1.9 | 41.6 | 31.7 | 21.2 |
| 25602-158 | D9 | Hexane | 76 | 1865 | 70.9 | 27.0 | 41.1 | 1.7 | 53.9 | 28.7 | 20.2 |
| 25602-163 | D9 | Hexane | 76 | 1434 | 68.3 | 28.9 | 49.0 | 2.9 | 58.7 | 31.7 | 17.3 |
| 25602-133 | D9 | Hexane | 81 | 1929 | 45.1 | 51.8 | 26.3 | 3.1 | 40.7 | 54.9 | 22.5 |
| 25602-129 | D9 | Hexane | 83 | 1781 | 43.9 | 52.0 | 32.6 | 3.6 | 48.5 | 55.7 | 20.7 |
| 25622-197 | D4 | Hexane | 86 | 1822 | 75.1 | 24.1 | 45.4 | 0.8 | 60.7 | 24.9 | 6.5 |
| 25622-119 | D4 | Hexane | 80 | 1603 | 74.2 | 25.1 | 31.8 | 0.9 | 48.0 | 26.0 | 3.9 |

TABLE 4

(Product Data for Resins made with (3'5'-tBu-Q)-Zr-Me$_2$ Precursor)

| | MFR | Crystallization | | Melting (first) | | Melting (second) | | | GPC DRI | | IR C$_2^=$ | |
|---|---|---|---|---|---|---|---|---|---|---|---|---|
| Synthesis # | g/10 min | Onset °C. | Peak °C. | Peak °C. | ΔHf J/g | Onset °C. | Peak °C. | ΔHf J/g | Mw kg/mol | Mw/Mn | mol % | wt % |
| 25602-125 | 6.0 | 91.3 | 87.5 | 123.8 | 80.9 | 68.2 | 123.1 | 66.6 | 251.7 | 2.12 | 5.9 | 4.0 |
| 25602-178 | 2.4 | 91.6 | 88.2 | 121.6 | 60.7 | 66.1 | 124.5 | 51.6 | 312.4 | 2.07 | 6.2 | 4.2 |
| 25602-172 | 3.7 | 91.3 | 88.2 | 119.0 | 74.1 | 68.5 | 123.6 | 62.2 | 311.5 | 2.14 | 6.5 | 4.5 |
| 25602-137 | 2.2 | 74.3 | 71.1 | 106.3 | 69.9 | 50.0 | 109.0 | 51.2 | 320.0 | 2.09 | 8.9 | 6.1 |
| 25622-021 | 11.7 | 70.5 | 68.2 | 106.5 | 60.5 | 13.7 | 105.0 | 49.4 | 185.8 | 2.03 | 9.4 | 6.5 |
| 25622-026 | 15.1 | 72 | 69.9 | 106.5 | 85.4 | 20.5 | 107.5 | 57.0 | 141.9 | 2.09 | 9.6 | 6.6 |
| 25622-006 | 5.3 | 70.1 | 67.3 | 103.0 | 47.0 | 54.6 | 104.4 | 32.7 | 257.0 | 2.06 | 9.9 | 6.8 |
| 25622-034 | 19.2 | 70.8 | 68.3 | 107.4 | 61.7 | 12.5 | 104.7 | 50.0 | 180.1 | 2.09 | 10.5 | 7.2 |
| 25602-153 | 5.9 | 67.6 | 64.7 | 103.4 | 63.1 | 36.6 | 100.7 | 47.8 | 210.1 | 1.98 | 10.7 | 7.4 |
| 25602-141 | 5.6 | 63.8 | 59.6 | 91.9 | 57.7 | 32.2 | 96.3 | 46.3 | 246.7 | 2.10 | 11.0 | 7.6 |
| 25622-030 | 23.7 | 68.9 | 66.1 | 93.2 | 53.5 | 15.9 | 103.4 | 46.6 | 154.8 | 2.05 | 11.1 | 7.7 |
| 25602-167 | 5.9 | 55.0 | 50.8 | 92.2 | 51.1 | 30.7 | 89.4 | 36.5 | 244.3 | 2.05 | 12.5 | 8.7 |
| 25602-158 | 4.6 | 53.4 | 48.2 | 87.2 | 50.2 | 22.6 | 87.0 | 32.0 | 230.4 | 2.02 | 13.2 | 9.2 |
| 25602-163 | 9.5 | 44.6 | 39.8 | 62, 91 | 41.4 | 21.1 | 80.6 | 31.2 | 176.7 | 1.98 | 13.9 | 9.7 |
| 25602-133 | 4.2 | 41.9 | 36 | 77.2, 95 | 34.0 | 27.2 | 77.8 | 25.5 | 249.8 | 2.15 | 14.0 | 9.8 |
| 25602-129 | 6.0 | 40.2 | 34.6 | 60, 87.6 | 37.2 | 24.1 | 76.7 | 24.9 | 204.9 | 2.06 | 14.5 | 10.2 |
| 25622-197 | 66.1 | 93.3 | 90 | 125.9 | 82.0 | 68.6 | 126.9 | 69.9 | 132.1 | 2.33 | 6.1 | 4.1 |
| 25622-119 | 14.2 | 91.4 | 87.5 | 127.5 | 89.9 | 71.7 | 126.6 | 62.7 | 200.5 | 2.03 | 6.3 | 4.3 |

A key characterization test that can be used to predict aspects of heat-seal resin performance is the melting distribution curve from DSC. This is a plot of the fraction of the polymer that is amorphous, f, versus temperature, T (Equivalently one could plot the crystalline fraction versus T.) It has been found that the temperature at which 77% of the sample becomes amorphous as it melts correlates well with the seal initiation temperature (SIT). This is deemed to be the point at which the resin becomes soft and pliable enough to begin to form a good bond under typical sealing pressures. Moreover, the temperature at which nearly all of the resin is amorphous (end of melting) correlates well with the plateau initiation temperature, PIT, and also with seal strength. So methods of predicting the melting distribution curve can be very useful in the design of compositions for heat-seal resins.

A number of factors control crystallizability, and, so, the melting distribution curve of a propylene copolymer. Two important variables are the tacticity and reactivity ratio product (sequence distribution) of the polymer, since both errors in propylene incorporation (stereo and regio) and comonomer act to punctuate crystallizable sequences. For a set of resins all made with the same catalyst, or with a family of catalysts that exhibit the same tacticity and sequence distribution, these factors will not vary, so the main determinant of melting behavior is the fraction of incorporated comonomer. Here we show the data from a series of T-catalyzed resins made in a continuous reactor to demonstrate how the various aspects of the melting distribution curve vary with ethylene content, and so approach model to predict heat-seal resin performance of these copolymers.

Several parameters have been extracted from the DSC melting distribution curves. They are the following:

+ the minimum amorphous content—fraction of resin that is amorphous at the plateau level of crystallinity at room temperature.
+ $T_{first\ melt}$—temperature at which the resin begins to melt as it is heated (here taken as when the amorphous content is 1% greater than the minimum).
+ $T_{0.77\ am}$—temperature at which amorphous content hits 77%, which correlates with SIT.
+ $T_{0.99\ am}$—temperature at which all of the resin is amorphous (here taken as when the amorphous content hits 99%, so that it can be distinguished from the plateau) which correlates with PIT.

These parameters were measured for both the first and second heat for the T-catalyzed series, as well as for some commercial resins and blends of the T polymers. These are tabulated below:

TABLE 5

(DSC Melting Distribution Data for Resins made with T-Zr-Me$_2$ Precursor)

| Sample | Composition | IR C$_2$ Content wt % | MFR g/10 min | DSC (1st heat) | | | | DSC (2nd heat) | | | |
|---|---|---|---|---|---|---|---|---|---|---|---|
| | | | | $T_{first\ melt}$ °C. | $T_{.77\ am}$ °C. | $T_{.99\ am}$ °C. | $X_{min}^{am}$ % | $T_{first\ melt}$ °C. | $T_{.77\ am}$ °C. | $T_{.99\ am}$ °C. | $X_{min}^{am}$ % |
| 25205-82 | | 0.0 | | 88 | 122 | 143 | 63 | 85 | 115 | 142 | 65 |
| 25205-88 | | 0.0 | | 82 | 119 | 137 | 66 | | | | |
| 25497-099 | — | 5.8 | 850.4 | 54 | 113 | 149 | 58 | 69 | 97 | 135 | 70 |
| 25497-107 | — | 6.3 | 29.8 | 51 | 106 | 119 | 62 | 67 | 85 | 114 | 72 |
| 25497-115 | — | 6.2 | 7.5 | 51 | 99 | 121 | 64 | 61 | 86 | 115 | 71 |
| 25497-128 | — | 4.9 | 3.8 | 90 | 111 | 126 | 65 | 80 | 95 | 124 | 73 |
| 25497-154 | — | 7.7 | 3.6 | 53 | 79 | 109 | 70 | 61 | 105 | 80 | |
| 25497-175 | — | 10.6 | 2.0 | 51 | 83 | 109 | 70 | 59 | 44 | 106 | 77 |
| 25497-188 | — | 17.8 | 3.4 | 43 | 60 | 93 | | | | | |
| 25497-103 | | 6.4 | 41.5 | | | | | | | | |

TABLE 5-continued (DSC Melting Distribution Data for Resins made with T-Zr-Me₂ Precursor)

| Sample | Composition | IR $C_2$ Content wt % | MFR g/10 min | DSC (1st heat) | | | | DSC (2nd heat) | | | |
|---|---|---|---|---|---|---|---|---|---|---|---|
| | | | | $T_{first\ melt}$ °C. | $T_{.77\ am}$ °C. | $T_{.99\ am}$ °C. | $X_{min}^{am}$ % | $T_{first\ melt}$ °C. | $T_{.77\ am}$ °C. | $T_{.99\ am}$ °C. | $X_{min}^{am}$ % |
| 24879-124-1 | 50/50 -188/-128 | 11.4 | 3.6 | 54 | 38 | 120 | 78 | 48 | | 120 | 83 |
| 24879-124-2 | 50/50 -103/-154 | 7.1 | 9.9 | 56 | 82 | 111 | 69 | 56 | 62 | 109 | 75 |
| 24879-124-3 | 50/50 -099/-175 | 8.2 | 12.4 | 59 | 93 | 125 | 66 | 62 | 75 | 120 | 74 |
| PP 9272 | — | 6.3 | 3.3 | 61 | 115 | 144 | 63 | 67 | 113 | 144 | 66 |
| Toray 'Commodity' RCP | — | 7.2 | 5.8 | 58 | 113 | 138 | 62 | 53 | 110 | 137 | 63 |
| Toray 'Advanced' RCP | — | 14.1 | 5.6 | 63 | 93 | 136 | 72 | 61 | 93 | 136 | 70 |

Some entries in Table 5 above are blank because they may not be available, while in other cases there are no data to report, such as $T_{0.77\ am}$ for a high ethylene copolymer that never reaches 23% crystallinity. The data are plotted versus ethylene content in the FIGS. 1 to 17 below. The lines in the figure are least-square fits to these results.

Determination of Ethylene Concentration by Infrared Spectroscopy (IR)

Ethylene analyses of ethylene-propylene copolymers were performed using thin polymer films following a procedure that is a modified version of ASTM 3900-05A [Standard Test Methods for Rubber—Determination of Ethylene Units in Ethylene-Propylene Copolymers and in Ethylene-Propylene-Diene Terpolymers by Infrared Spectrometry]. The calibration correlated the area ratio of the peaks at 1155 and 722 cm¹, representing the methyl wag and —(CH$_2$)$_n$— rocking vibrations, respectively, and was fitted by the following expression:

$$\text{Ethylene wt \%} = 72.698 - 86.495X + 13.696X^2$$

wherein X=(peak area at 1155 cm$^{-1}$)/(peak area at 722 cm$^{-1}$). The calibration was incorporated into a spectral processing macro that ran within the OMNIC 7.1 operating software (driver version 7.2, firmware version 1.26) of Nicolet 6700 FTIR (Thermo Electron Corp.).

Gel Permeation Chromatography (GPC)

GPC was performed using a Waters GPCV 2000 (Gel Permeation Chromatograph) with triple detection. The three detectors were in series with Wyatt DAWN "EOS" MALLS 18 angle laser light scattering detector first, followed by the DRI (Differential Refractive Index) then Differential Viscometer detector. The detector output signals were collected on Wyatt's ASTRA software and analyzed using a GPC analysis program. The detailed GPC conditions are listed in Table 6 below.

Standards and samples were prepared in an inhibited TCB (1,2,4-trichlorobenzene) solvent. Four NBS polyethylene standards were used for calibrating the GPC. Standard identifications are listed in Table 6. The samples were accurately weighed and diluted to a ~1.5 mg/mL concentration and recorded. The standards and samples were placed on a PL Labs 260 Heater/Shaker at 160° C. for two hours. These were filtered through a 0.45 µm stainless steel filter cup then analyzed.

TABLE 6

(GPC Instrument and Method used for Determining Molecular Weight, Molecular Weight Distribution, and g')

| | | |
|---|---|---|
| INSTRUMENT#28 | | WATERS 2000 V + Wyatt Dawn EOS |
| COLUMN | Type: | 3 × MIXED BED TYPE "B" 10 MICRON PD (high porosity columns) |
| | Length: | 300 mm |
| | ID: | 7.8 mm |
| | Supplier | POLYMER LABS |
| SOLVENT PROGRAM | A | 0.54 mL/min TCB inhibited (inhibited with BHT at 1500 ppm w/v %) BHT is 2,6-di-tert-butyl-4-methylphenol GPC console setting is 0.5 mL/min to which 8% expansion factor(from Waters) makes actual flow 0.54 mL/min |
| DETECTOR | A: | Wyatt MALLS 17 angle laser light scattering detector |
| | B: | DIFFERENTIAL REFRACTIVE INDEX (DRI) in series to the |
| | C: | Viscometer IDvol. = +232.2 microliter LS to DRI IDvol. = −91.8 microliter Dp to DRI |
| TEMPERATURE | Injector: | 135° C. |
| | Detector: | 135° C. |
| | Column: | 135° C. |
| DISOLUTION CONDITIONS | | Shaken for 2 hr on a PL SP260 Heater Shaker @ 160° C. |
| SAMPLE FILTRATION | | Through a 0.45 µm SS filter @ 135° C. |
| INJECTION VOLUME | | 329.5 microliter |
| SAMPLE CONCENTRATION | | 0.15 w/v % (1.5 mg/mL) Target wt |
| SOLVENT DILUENT | | TCB inhibited |
| DATE | | Jun. 20, 2006 |
| CLIENT/PROGRAM | | Gabor Kiss |
| CALIBRATION NARROW PE STANDARDS | | NIST1482a; NIST1483a; NIST1484a |
| BROAD PE STANDARD | | NIST1475a |

Differential Scanning Calorimetry (DSC)

Phase transitions were measured on heating and cooling the sample from the solid state and melt, respectively, using DSC. The crystallization ($T_c$) and melting temperature ($T_m$) measurements were conducted using a TA Instrument MDSC 2920 or Q1000 Tzero-DSC and data analyzed using the standard analysis software provided by the vendor. Typically, 3 to 10 mg of polymer was placed in an aluminum pan and loaded into the instrument at room temperature. The sample was cooled to either −130° C. or −70° C. and then heated to 210° C. at a heating rate of 10° C./min to evaluate the glass transition and melting behavior for the as-received polymers. Then the sample was held at 210° C. for 5 minutes to destroy its thermal history. Crystallization behavior was evaluated by cooling the sample from the melt to sub-ambient temperature at a cooling rate of 10° C./minute. The sample was held at the low temperature for 10 minutes to fully equilibrate in the solid state and achieve a steady state. Second heating data were measured by heating this melt-crystallized sample at 10° C./minute. The second heating data thus provided phase behavior information for samples crystallized under controlled thermal history. The endothermic melting transition (first and second melt) and exothermic crystallization transition were analyzed for onset of transition and peak temperatures. The melting temperatures were the peak melting temperatures from the second melt, unless otherwise indicated. For polymers displaying multiple peaks, the higher melting peak temperature was reported. Glass transition temperature values were defined by the temperature at which the heat capacity change ($\Delta c_p$) is half of its total value (step-change between equilibrium liquid to equilibrium solid state) at which point half of the sample was devitrified.

Areas under the DSC curve were used to determine the heat of fusion ($H_f$), which was also used to calculate the degree of crystallinity. 8.7 kJ/mol was taken as the equilibrium heats of fusion for the 100% crystalline polypropylene. The percent propylene crystallinity values were calculated by using the following formulas:

Propylene crystallinity=[area under the curve(J/g)×42 g/mol/8700 (J/mol]*100%.

Melt Flow Rate (MFR)

Product MFRs were determined by using a Dynisco Kayeness Polymer Test Systems Series 4003 apparatus following ASTM D1238 and ISO 1133 methods. The measurement protocol followed the Series 4000 Melt Indexer Operation manual, Method B. All samples were stabilized by using Irganox 1010.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A heat-seal resin, comprising:
   5 wt % to 95 wt % of a first copolymer and
   95 wt % to 5 wt % of a second copolymer based on the total weight of the resin,
   wherein the first copolymer and the second copolymer together are 90 wt % or more of the total weight of the resin,
   wherein the first copolymer includes
      a first monomer of an alphaolefin of 2 to 4 carbon atoms and
      a second monomer selected from a second monomer of an alphaolefin of 2 to 8 carbon atoms,
   wherein the first monomer and the second monomer of the first copolymer are different, wherein the first copolymer has an MFR of from 5 to 1000 g/10 minutes and a $T_{fm}$ of 66° C. to 80° C.,
   wherein the second copolymer includes
      a first monomer of an alphaolefin of 2 to 4 carbon atoms and
      a second monomer selected from a second monomer of an alphaolefin of 2 to 8 carbon atoms,
   wherein the first monomer and the second monomer of the second copolymer are different, wherein the second copolymer has an MFR of from 0.5 to 5 g/10 minutes and a $T_{fm}$ of 45° C. to 66° C., wherein the first copolymer has an MFR of at least 2 g/10 minutes greater and a $T_{fm}$ of at least 10° C. greater than the second copolymer.

2. The resin of claim 1, wherein the first and second copolymers are ethylene/propylene copolymers, wherein the first copolymer includes 2 wt % to 6 wt % ethylene and the second copolymer includes 6 wt % to 12 wt % ethylene, wherein the first copolymer has a lower ethylene content than the second copolymer.

3. The resin of claim 1, wherein the first copolymer has an MFR of at least 5 g/10 minutes greater and a $T_{fm}$ of at least 20° C. greater than the second copolymer.

4. The resin of claim 1, wherein the first and second copolymers are ethylene/butylene copolymers.

5. The resin of claim 1, wherein the first and second copolymers are propylene/butylene copolymers.

6. A package, comprising the resin of claim 1.

* * * * *